(12) United States Patent
Liu et al.

(10) Patent No.: US 8,049,438 B2
(45) Date of Patent: Nov. 1, 2011

(54) DRIVING CIRCUITS AND CONTROLLERS FOR CONTROLLING POWER TO A LOAD

(75) Inventors: Da Liu, Milpitas, CA (US); ShengTai Lee, Taipei (TW); Youling Li, Shenzhen (CN)

(73) Assignee: O2Micro, Inc., Santa Clara, CA (US)

( * ) Notice: Subject to any disclaimer, the term of this patent is extended or adjusted under 35 U.S.C. 154(b) by 525 days.

(21) Appl. No.: 12/229,010

(22) Filed: Aug. 18, 2008

(65) Prior Publication Data

US 2010/0039048 A1 Feb. 18, 2010

(51) Int. Cl.
| | |
|---|---|
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/00 | (2006.01) |
| H05B 41/14 | (2006.01) |

(52) U.S. Cl. ............... 315/297; 315/209 R; 315/210; 315/212; 315/291; 315/294; 315/307; 315/312

(58) Field of Classification Search ............. None
See application file for complete search history.

(56) References Cited

U.S. PATENT DOCUMENTS

| | | | | |
|---|---|---|---|---|
| 5,923,129 | A * | 7/1999 | Henry | 315/307 |
| 7,095,632 | B2 * | 8/2006 | Fukumoto | 363/17 |
| 7,236,375 | B2 | 6/2007 | Fukumoto et al. | |
| 7,545,106 | B2 * | 6/2009 | Ger et al. | 315/307 |
| 7,545,369 | B1 * | 6/2009 | Lan et al. | 345/204 |
| 7,599,202 | B2 | 10/2009 | Fukumoto | |
| 2008/0012510 | A1 * | 1/2008 | Po | 315/308 |

FOREIGN PATENT DOCUMENTS

| | | |
|---|---|---|
| CN | 1620747 A | 5/2005 |
| CN | 100486095 C | 1/2007 |
| WO | 2008006024 A2 | 1/2008 |

* cited by examiner

*Primary Examiner* — Douglas W Owens
*Assistant Examiner* — Dedei K Hammond

(57) ABSTRACT

A driving circuit for driving loads includes a switch circuit, a transformer, a current sensing circuit, and an inverter controller. The switch circuit and the transformer are used for converting a DC electric power to an AC electric power so as to energize the loads. The current sensing circuit coupled to the loads generates a feedback current signal indicative of a current flowing through the loads. The inverter controller includes a switch drive circuit, a current regulation circuit receiving the feedback current signal, and a mode controller circuit. The switch drive circuit controls the switch circuit so as to adjust power delivered to the primary winding of the transformer in accordance with the feedback current signal. The mode controller disables the switch circuit through the switch drive circuit if the external signal is in an absence state for a predetermined period.

16 Claims, 2 Drawing Sheets

DRIVING CIRCUITS AND CONTROLLERS FOR CONTROLLING POWER TO A LOAD

TECHNICAL FIELD

The present invention relates to a driving circuit, and more particularly, to a driving circuit for driving light sources.

BACKGROUND ART

Liquid crystal display (LCD) panels are used in various applications including portable electronic devices and fixed location units, such as laptops, video cameras, mobile phones, PDAs, game machines, medical instruments, automobile navigation systems, and industrial machines. In LCD applications, usually backlighting is needed to illuminate the panel. Typically, LCD backlighting can be used to provide higher brightness, longer lifetime and better uniformity features. There are many types of LCD backlighting sources, such as Electroluminescent Lamps (ELs), Light Emitting Diodes (LEDs), Cold Cathode Fluorescent Lamps (CCFLs), Flat Fluorescent Lamps (FFLs), External Electrode Fluorescent Lamps (EEFLs), Hot Cathode Fluorescent Lamps (HCFLs), and Carbon Nano Tubes (CNTs).

CCFL backlighting is commonly used in graphics and color displays, and is well suited for use in large and middle scale LCD panels. Moreover, the CCFL can be used as the illumination source for LCD panels, and may be composed of a phosphor coated glass cylinder with cathodes at either end. Further, with the increasing demanding in larger size of LCD panels, e.g., in LCD televisions or large-size LCD monitors, backlighting systems may operate with multiple CCFLs to provide desired illumination.

A high voltage Direct Current/Alternating Current (DC/AC) converter (known as an inverter) is usually required to drive the CCFL. Most CCFL DC/AC converters may be formed as tuned switch circuits designed to produce an output AC power with a specific voltage and frequency. For example, a typical CCFL inverter needs to output about 20~80 kHz AC, with an operating voltage of about 400~800V RMS (Root Mean Square). The inverter controller circuits can include voltage and/or current feedbacks, and dimming control. However, the prior art integrated circuit inverter controllers may have relatively high component count.

SUMMARY OF THE INVENTION

In one embodiment, the present invention provides a driving circuit for driving a plurality of loads and including a switch circuit, a transformer, a current sensing circuit, and an inverter controller. The switch circuit is used for converting a DC electric power to a first AC electric power. The transformer has a primary winding and a secondary winding. The primary winding is coupled to the switch circuit for receiving the first AC electric power and energizing the secondary winding so as to generate a second AC electric power from the secondary winding to energize the plurality of loads. The current sensing circuit is coupled to the loads for generating a feedback current signal indicative of a current flowing through the loads. The inverter controller is used for controlling the switch circuit, and includes a switch drive circuit, a lamp current regulation circuit, and a mode controller. The switch drive circuit is used for controlling the switch circuit so as to adjust the first AC electric power delivered to the primary winding of the transformer in accordance with the feedback current signal. The lamp current regulation circuit receives the feedback current signal. The mode controller receives an external signal, and disables the switch circuit through the switch drive circuit if the external signal is in an absence state for a predetermined period of time.

BRIEF DESCRIPTION OF THE DRAWINGS

Other objects, advantages, and novel features of the invention will become more apparent from the following detailed description when taken in conjunction with the accompanying drawing.

DETAILED DESCRIPTION

Reference will now be made in detail to the embodiments of the present invention, inverter controller and system. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
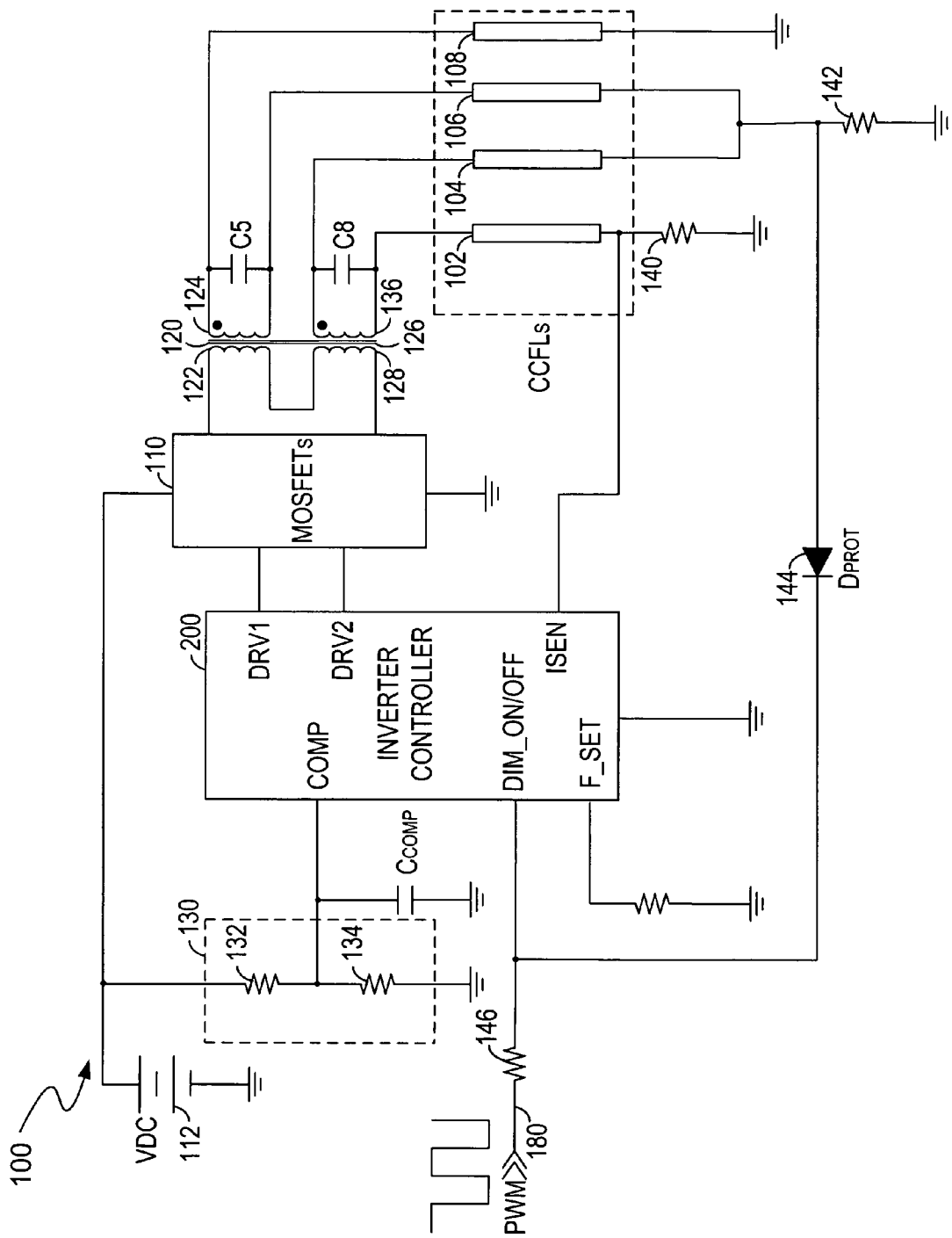
FIG. 1 is a diagram showing a driving circuit for driving a plurality of CCFLs, in accordance with one embodiment of the present invention.

Referring to FIG. 1, an exemplary driving circuit 100 according to one embodiment of the present invention is illustrated. The driving circuit 100 is used to drive one or a plurality of loads, such as cold cathode fluorescent lamps (CCFLs) 102, 104, 106, and 108. The driving circuit 100 includes a switch circuit 110 coupled to an external Direct Current (DC) electric power source, such as a battery 112. The switch circuit 110 serves as a DC/AC converter or an inverter and is used for converting a DC electric power from the battery 112 to a first Alternating Current (AC) electric power, in one embodiment.

The driving circuit 100 includes a transformer 120 which can have a core 126 and multiple windings including primary windings 122 and 128, and secondary windings 124 and 136. In this embodiment, the primary winding 122 and the primary winding 128 are coupled to each other in series. As such, the primary winding 122 and the primary winding 128 can also be recognized as one primary winding. CCFLs 102 and 104 are coupled to the secondary winding 136 in series, and CCFLs 106 and 108 are coupled to the secondary winding 124 in series. The first AC electric power from the switch circuit 110 is delivered to the primary windings 122 and 128 to induce the secondary windings 124 and 136 to output a second AC electric power to the CCFLs 102, 104, 106 and 108. Since the CCFLs 102 and 104 are coupled to each other in series and the CCFLs 106 and 108 are coupled to each other in series, the currents flowing through the CCFLs 102 and 104 is substantially the same and the currents flowing through the CCFLs 106 and 108 is substantially the same, in one embodiment.

In another embodiment, the driving circuit 100 may include two or more transformers with separated cores. The primary windings of the transformers can be coupled to each other in series, thus the currents flowing through the CCFLs can be balanced. In other embodiments, other elements, such as a balancing control circuit, can be used to balance the currents flowing through the CCFLs.

Referring to the example in FIG. 1, the driving circuit 100 includes an open lamp sensing circuit which includes an open lamp sensing resistor 142. As shown in FIG. 1, the CCFLs 104 and 108 are coupled to the polarity ends of the secondary windings 136 and 124, respectively, and the CCFLs 102 and 106 are coupled to the non-polarity ends of the secondary windings 136 and 124, respectively. The open lamp sensing resistor 142 couples the CCFLs 104 and 106 to ground. During a normal operation condition, since the CCFL 104 and the CCFL 106 are coupled to the polarity end of the secondary winding 136 and the non-polarity end of the secondary winding 124, respectively, the currents flowing through the CCFL 104 and the CCFL 106 are substantially at the same RMS (root mean square) level, but with inversed phases, in one embodiment. Therefore, the current flowing through the open lamp sensing resistor 142 is substantially zero during normal operation, in one embodiment.

If one of the CCFLs 102, 104, 106, and 108 is in an open lamp condition, the voltage at the open lamp sensing resistor 142 will rise, in one embodiment. For example, if CCFL 102 is in an open lamp condition, the current flowing through CCFLs 102 and 104 will be reduced but the current through CCFLs 106 and 108 is unchanged. As a result, the voltage at the open lamp sensing resistor 142 can be increased if CCFL 102 is in an open lamp condition. Once the voltage at the open lamp sensing resistor 142 rises, the inverter controller 200 can receive a voltage signal through a diode 144. The voltage signal from the open lamp sensing resistor 142 can be used to determine whether an open lamp condition occurs or not. If the open lamp condition is detected, the inverter controller 200 will be shut down, in one embodiment.

Furthermore, in another embodiment, the CCFLs 104 and 106 are not coupled to ground. The CCFL 102, the secondary winding 136, the CCFL 104, the CCFL 106, the secondary winding 124, and the CCFL 108 in sequence are coupled to each other in series. The secondary windings 124 and 136 can induce the current flowing through the CCFLs 102, 104, 106, and 108 in sequence or through the CCFLs 108, 106, 104, and 102 in sequence. In this embodiment, the open lamp sensing resistor 142 can be eliminated. The currents flowing the CCFLs 102, 104, 106, and 108 can be further balanced.

The switch circuit 110 includes a plurality of switches, such as MOSFETs or other transistor types, and can be formed as varies circuits, such as a Royer, a full-bridge, a half-bridge, or a push-pull inverter circuit architecture. For example, according to one embodiment of the present invention, the switch circuit 110 may be formed as a half-bridge inverter circuit including two MOSFETs coupled to each other in series. In another embodiment, the inverter controller 200 may be modified to include another pair of drive signals to enable the inverter controller 200 to drive a full bridge inverter circuit.

In order to ignite the CCFLs 102, 104, 106, and 108, a suitable AC electric power with high voltage and high frequency is provided, in one embodiment. For example, the starting voltage for igniting the CCFLs 102, 104, 106, and 108 exceeds about 1,000 volts RMS, the operating voltage for operating CCFLs 102, 104, 106, and 108 under normal conditions is between about 400 and 800 volts RMS after the CCFLs 102, 104, 106, and 108 are ignited, and the frequency is about 20~80 kHz.

In accordance with one embodiment of the present invention, the first AC electric power output from the switch circuit 110 is at a relatively low voltage level. The transformer 120 is used to boost the first AC electric power and to output the second AC electric power with a higher voltage level. The voltage across the secondary windings 124 and 136 is proportional to the ratio of turns of the secondary windings 124 and 136 to turns of the primary windings 122 and 128 times the voltage across the primary winding 122. The secondary windings 124 and 136 are coupled to the CCFLs 102, 104, 106, and 108 to energize them.

The driving circuit 100 includes a current sensing circuit 140 having a resistor coupled to at least one of the CCFLs 102, 104, 106, and 108 in series for sensing the current flowing through one of the CCFL 102, 104, 106, and 108 or for sensing the current flowing through the plurality of CCFLs 102, 104, 106, and 108. A current sensing signal can be generated by the current sensing circuit 140 and sent to the inverter controller 200 as a feedback control signal.

An external dimming control signal 180, e.g., a pulse-width modulation (PWM) signal, is transmitted into the inverter controller 200, in one embodiment. The external dimming control signal 180 can be used for adjusting or dimming the light of the CCFLs 102, 104, 106, and 108. Advantageously, the driving circuit 100 can work at a striking mode, a normal operation mode, and a standby mode, in one embodiment. When the external dimming control signal 180 is present and the inverter controller 200 senses external dimming control signal 180, the driving circuit 100 first works at the striking mode and the inverter controller 200 controls the switch circuit 110 to deliver the first AC electric power to the first windings 122 and 128 of the transformer 120 and to ignite the CCFLs 102, 104, 106, and 108, in one embodiment. After the CCFLs 102, 104, 106 and 108 are properly ignited, the driving circuit 100 can work at the normal operation mode. In one embodiment, if the sensing signal generated by the current sensing circuit 140 is greater than a predetermined current value, the driving circuit 100 can start working at the normal operation mode and the inverter controller 200 controls the switch circuit 110 to dim the light of CCFLs 102, 104, 106, and 108. When the external dimming PWM signal is not present and the inverter controller 114 cannot sense the external dimming control signal, the driving circuit 100 can work at a standby mode and the inverter controller 200 can disable the switch circuit 110. The CCFLs 102, 104, 106, and 108 will not be lit at the standby mode.

In accordance with one embodiment of the present invention, the driving circuit 100 includes a voltage sense circuit 130 comprising two resistors 132 and 134. The two resistors 132 and 134 are coupled to each other in series and formed as a voltage divider 130 so as to provide a voltage signal which represents the voltage level of the DC electric power source 112 to the inverter controller 200.

The inverter controller 200 can be formed or packaged as an integral circuit (IC). In one embodiment, the inverter controller 200 includes 8 pins which will be described in relation with FIG. 2. As shown in FIG. 1, the driving circuit 100 provides a DC/AC inverter circuitry with reduced component count. For example, as shown in FIG. 1, the total component count of the driving circuit 100 for a multi-lamp application can be less than 15.

Figure 2:
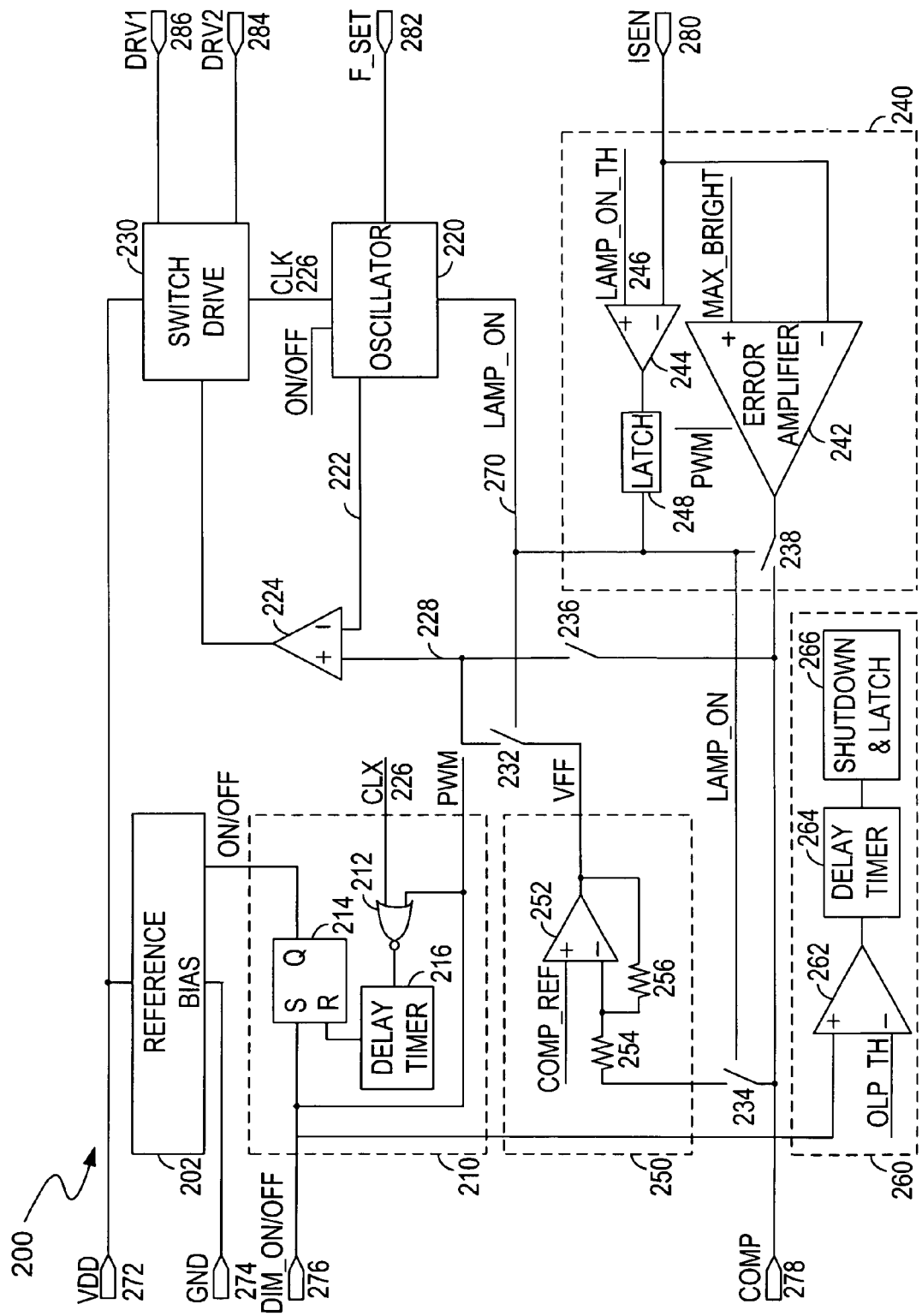
FIG. 2 is a diagram showing an inverter controller, in accordance with one embodiment of the present invention.

Referring to FIG. 2, an exemplary inverter controller 200 according to one embodiment of the present invention is illustrated. The inverter controller 200 will be described in combination with the driving circuit 100 in FIG. 1. As described hereinabove, the inverter controller 200 can be packed as an 8-pin IC package and include 8 pins 272, 274, 276, 278, 280, 282, 284, and 286. The pins 272 and 274 of the inverter controller 200 are coupled to a voltage source and ground respectively.

The inverter controller 200 includes a mode controller 210, a voltage compensation circuit 250, a lamp current regulation circuit 240, a switch drive circuit 230, an open lamp protection circuit 260, an oscillator 220 and a reference bias circuit 202, in one embodiment. The reference bias circuit 202 is used to generate an internal reference voltage for the components in the inverter controller 200.

The mode controller 210 is coupled to the pin 276 which receives an external dimming control signal 180. As shown in FIG. 2, the mode controller 210 includes a RS flip flop 214, a NOR gate 212 and a delay timer 216. Once the external dimming control signal 180 is present, the output of the RS flip flop 214 can remain in a high state so as to turn on the inverter controller 200. As a result, the inverter controller 200 can operate in the normal operation mode or the striking mode. If the external dimming control signal 180 is not present or remains in an absence state (e.g., a low state), the delay timer 216 is initiated, in one embodiment. After the time set by the delay timer 216 expires, the RS flip flop 214 will be reset and the output of the RS flip flop 214 switches to a low state to turn off the inverter controller 200. As such, the inverter controller 200 can operate in the standby mode until the external dimming control signal 180 is present.

The oscillator 220 is used to generate a clock signal 226 at a operation frequency or at a striking frequency depending on the normal operation mode or the striking mode, which is transmitted to the switch drive circuit 230. A ramp signal 222 is also generated and transmitted to a comparator 224 and is compared with a duty signal 228 so as to determine a duty cycle of a burst mode PWM signal generated by the comparator 224. The burst mode PWM signal is transmitted to the switch drive circuit 230. The switch drive circuit 230 controls the switch circuit 110 of the driving circuit 100 and adjusts the AC electric power delivered to the first windings 122 and 128 for dimming the light of the CCFLs 102, 104, 106, and 108 according to the burst mode PWM signal. The frequency of the burst mode PWM signal is selected to be far less than the operation frequency of the clock signal 226, in one embodiment. For example, for CCFL applications, the operation frequency of the clock signal 226 can be about 35-80 kHz, and the frequency of the burst mode PWM signal can be about 200 Hz.

The switch drive circuit 230 outputs two driving signals for driving switches in the switch circuit 110. The two driving signals from the switch drive circuit 230 can be 180 degree out of phase. The driving signals can be used to drive two switches of a derived Royer circuit, a push pull circuit, a half bridge circuit or other two-switch inverter circuits. In another embodiment, another pair of driving signals can be generated based on the driving signals from the switch drive circuit 230 so as to drive four switches in a full bridge inverter circuit.

The voltage compensation circuit 250 is coupled to the pin 278 for receiving a compensation (sensing) signal from the voltage sense circuit 130 of the driving circuit 100, in one embodiment. The voltage compensation circuit 250 includes an operational amplifier 252, and two resistors 254 and 256 to form an inverting amplifier. The voltage level of the output signal of the voltage compensation circuit 250 is inversely proportional to the compensation (sensing) signal at pin 278, in one embodiment. For example, the voltage of the output signal of the voltage compensation circuit 250 will drop when the voltage of the received compensation signal at the pin 278 rises.

The lamp current regulation circuit 240 is coupled to the pin 280 for receiving a feedback current sensing signal from the current sensing circuit 140, in one embodiment. The lamp current regulation circuit 240 includes an error amplifier 242, a comparator 244 and a latch 248. The comparator 244 is used to compare a predetermined lamp-on threshold current value 246 with the feedback current sensing signal at the pin 280.

During operation, when the electric power is supplied to the pin 272 and the dimming control signal 180 at the pin 276 is detected, and the feedback current sensing signal at the pin 280 is less than the predetermined lamp-on threshold current value 246, the inverter controller 200 works at a striking mode. In the striking mode, switches 232 and 234 are turned on or enabled, and switches 236 and 238 are turned off or disabled. The input end and the output end of the voltage compensation circuit 250 are coupled to the pin 278 and the comparator 224, respectively. The lamp current regulation circuit 240 is decoupled from the switch drive circuit 230. As mentioned hereinabove, the voltage level of the output signal of the voltage compensation circuit 250 is inversely proportional to the voltage level of the received compensation signal at the pin 278. In this case, the output voltage of the voltage compensation circuit 250 and the ramp signal 222 are transmitted to the comparator 224, and the voltage from the transformer 120 can be limited to a relatively narrow range which is near a preset striking voltage. The preset striking voltage can be predetermined by properly setting the reference signal COMP_REF and by properly choosing the resistors 254 and 256.

Once the CCFL is ignited and the current sensing signal at the pin 280 is greater than the predetermined lamp-on threshold current value 246, the latch 248 will enable the lamp-on signal 270 which will turn off or disable the switches 232 and 234 and turn on or enable the switches 236 and 238. As such, the inverter controller 200 works at the normal operation mode. The noninverting input of the comparator 224 is coupled to the pin 278 and the output of the error amplifier 242 of the lamp current regulation circuit 240. The voltage compensation circuit 250 is decoupled from the switch drive circuit 230. The error amplifier 242 can compare the current sensing signal at the pin 280 with a reference signal MAX_BRIGHT which can indicate a desired or maximum brightness of the CCFLs 102, 104, 106 and 108. The output of the error amplifier 242 combined with the voltage sensing signal received at the pin 278 is transmitted to the comparator 224 via the switch 236. The duty cycle of the burst mode PWM signal from the comparator 224 can be determined or controlled by the output of the error amplifier 242 and the signal received at the pin 278. Closed loop lamp current regulation is achieved in the normal operation mode. Advantageously, the voltage compensation circuit 250 and the current regulation circuit 240 both receive the voltage sensing signal received at the pin 278 and both share the same pin 278, thereby reducing total pin count of the inverter controller 200, in one embodiment.

Accordingly, when the feedback current sensing signal at the pin 280 is less than the predetermined lamp-on threshold current value 246, the inverter controller 200 can work at the striking mode. In the striking mode, the voltage compensation circuit 250 is coupled to the switch drive circuit 230 and the lamp current regulation circuit 240 is decoupled from the switch drive circuit 230, in one embodiment. In the striking mode, the PWM generator, e.g., the comparator 224 generates the burst mode PWM signal according to the output signal from the voltage compensation circuit 250. More specifically, the comparator 224 compares the output signal from the voltage compensation circuit 250 with the ramp signal 222 to control the duty cycle of the burst mode PWM signal.

When the feedback current sensing signal at the pin 280 is greater than the predetermined lamp-on threshold current value 246, the inverter controller 200 can work at the normal operation mode. In the normal operation mode, the voltage compensation circuit 250 is decoupled from the switch drive circuit 230 and the lamp current regulation circuit 240 is coupled to the switch drive circuit 230, in one embodiment. In the normal operation mode, the PWM generator, e.g., the comparator 224 generates the burst mode PWM signal according to the error signal from the error amplifier 242. More specifically, the comparator 224 compares the error signal from the error amplifier 242 with the ramp signal 222 to control the duty cycle of the burst mode PWM signal. The duty cycle of the burst mode PWM signal can be adapted to dim light of the CCFLs 102, 104, 106, and 108.

The open lamp protection circuit 260 receives the voltage signal from the open lamp sensing resistor 142 through the pin 276, in one embodiment. The open lamp protection circuit 260 includes a comparator 262, a delay timer 264, and a shutdown circuit 266. The comparator 262 receives the voltage signal through the pin 276 and compares the voltage signal with an internal open lamp threshold. Once the voltage signal at the pin 276 exceeds the internal open lamp threshold, the delay timer 264 is initiated or actuated to count the shutdown delay time, in one embodiment. After the delay timer expires, the inverter controller 200 will be shut down and latched. If the voltage signal at the pin 276 drops below the internal open lamp threshold before the delay timer expires, the inverter controller can continue working at the normal operation mode.

Advantageously, in one embodiment, the inverter controller 200 can be automatically shut down so as to work at the standby mode if the external dimming control signal 180 at pin 276 is not present or in an absence state for a predetermined time period. In the inverter controller 200, the voltage compensation circuit 250 and the lamp current regulation circuit 240 can share the same pin 278 and can control the load power in the striking mode and the normal operation mode respectively.

The present invention is not limited to powering CCFLs. The inverter controller 200 of the present invention can also be used to drive other types of loads or light sources, such as metal halide or sodium vapor. For example, the inverter controller 200 of the present invention can also be adapted to operate in a frequency range to support driving an x-ray tube or other higher frequency loads.

While the foregoing description and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A driving circuit for driving a plurality of loads comprising:

a switch circuit operable for converting a DC electric power to a first AC electric power;

a transformer coupled to said switch circuit and operable for transforming said first AC electric power to a second AC electric power to power said plurality of loads;

a current sensing circuit coupled to at least one of said plurality of loads and operable for generating a feedback signal indicative of a current flowing through said plurality of loads; and an inverter controller coupled to said switch circuit, operable for receiving a sensing signal indicative of a level of an input DC voltage, operable for generating an output signal inversely proportional to said sensing signal, operable for generating an error signal by comparing said feedback signal with a predetermined threshold, and operable for generating a pulse-width modulation (PWM) signal to control said first AC electric power, wherein said inverter controller generates said pulse-width modulation signal according to said output signal if said feedback signal is less than a predetermined threshold and according to said error signal if said feedback signal is greater than said predetermined threshold.

2. The driving circuit as claimed in claim 1, further comprising:

an open load sensing circuit coupled to said plurality of loads and operable for detecting an open load condition; and an open load protection circuit operable for shutting down said inverter controller if said open load condition is detected.

3. The driving circuit as claimed in claim 1, wherein said transformer comprises a primary winding, a first secondary winding, and a second secondary winding, and wherein said primary winding is coupled to said switch circuit for receiving said first AC electric power and energizing said first and second secondary windings so as to energize said plurality of loads.

4. The driving circuit as claimed in claim 3, wherein said plurality of loads comprises a first lamp, a second lamp, a third lamp, and a fourth lamp, and wherein said first lamp is coupled to a polarity end of said first secondary winding in series, said second lamp is coupled to a non-polarity end of said first secondary windings in series, said third lamp is coupled to a polarity end of said second secondary winding in series, and said fourth lamp is coupled to a non-polarity end of said second secondary winding in series.

5. The driving circuit as claimed in claim 4, further comprising:

an open lamp sensing resistor coupled to said second lamp and said third lamp in series; and an open lamp protection circuit operable for comparing a voltage across said open lamp sensing resistor with a predetermined open lamp threshold value, and operable for shutting down said inverter controller if said voltage across said open lamp sensing resistor is greater than said predetermined open lamp threshold value.

6. The driving circuit as claimed in claim 1, further comprising:

a second transformer having a primary winding coupled to said switch circuit for receiving said first AC electric power and a secondary winding for energizing said plurality of loads.

7. The driving circuit as claimed in claim 1, wherein said plurality of loads comprises a plurality of cold cathode fluorescent lamps (CCFLs).

8. The driving circuit as claimed in claim 7, wherein said inverter controller further comprises an oscillator operable for generating a ramp signal compared with a duty signal so as to generate a burst mode PWM signal transmitted to said switch drive circuit, wherein a duty cycle of said burst mode PWM signal is adapted to dim light of said plurality of CCFLs.

9. The driving circuit as claimed in claim 8, wherein said duty cycle of said burst mode PWM signal is varied in accordance with said feedback signal.

10. An inverter controller for controlling power to a load, said inverter controller comprising:
- a voltage compensation circuit operable for receiving a sensing signal indicative of a level of an input DC voltage and for generating an output signal inversely proportional to said sensing signal;
- a current regulation circuit operable for receiving said sensing signal and operable for generating an error signal by comparing a feedback signal indicative of a load current of said load with a load control signal;
- a pulse width modulation generator operable for generating a pulse width modulation signal according to said output signal if said feedback signal is less than a predetermined threshold and according to said error signal if said feedback signal is greater than said predetermined threshold; and
- a switch drive circuit operable for receiving said pulse width modulation signal and for generating a driving signal for controlling power to said load.

11. The inverter controller as claimed in claim 10, wherein said pulse width modulation generator comprises a comparator operable for comparing said output signal with a ramp signal if said feedback signal is less than said predetermined threshold and operable for comparing said error signal with said ramp signal if said feedback signal is greater than said predetermined threshold.

12. The inverter controller as claimed in claim 10, further comprising:
- a mode controller operable for receiving a dimming control signal and operable for disabling said switch drive circuit if said dimming control signal is in an absence state for a predetermined period of time.

13. The inverter controller as claimed in claim 10, further comprising:
- an open load protection circuit operable for shutting down said inverter controller if an open load condition is detected at said load.

14. The inverter controller as claimed in claim 10, further comprising:
- a comparator operable for comparing said feedback signal with said predetermined threshold and operable for decoupling said voltage compensation circuit from said switch drive circuit if said feedback signal is greater than said predetermined threshold.

15. The inverter controller as claimed in claim 10, further comprising:
- a comparator operable for comparing said feedback signal with said predetermined threshold and operable for decoupling said current regulation circuit from said switch drive circuit if said feedback signal is less than said predetermined threshold.

16. The inverter controller as claimed in claim 10, wherein said load comprises a light source.

* * * * *